US005435347A

United States Patent [19]

Gillingham

[11] Patent Number: 5,435,347

[45] Date of Patent: Jul. 25, 1995

[54] EXHAUST SYSTEMS FOR MOTORIZED VEHICLES

[75] Inventor: Gary Gillingham, Prior Lake, Minn.

[73] Assignee: Donaldson Company, Inc., Minneapolis, Minn.

[21] Appl. No.: 96,481

[22] Filed: Jul. 22, 1993

[51] Int. Cl.[6] .......................... F16K 11/02; F02D 9/06

[52] U.S. Cl. .................................... 137/599; 181/237; 188/273

[58] Field of Search ............................. 137/599, 599.1; 181/237; 188/273

[56] References Cited

U.S. PATENT DOCUMENTS

| | | | |
|---|---|---|---|
| 1,588,569 | 6/1926 | Best | 188/273 |
| 1,747,014 | 2/1930 | Kersey | 181/237 |
| 1,752,229 | 3/1930 | Brueckel | 188/273 |
| 2,074,651 | 3/1937 | Huffman et al. . | |
| 3,897,852 | 8/1975 | Hoffman et al. | 181/237 |
| 4,093,046 | 6/1978 | Perr . | |
| 4,149,618 | 4/1979 | Horie . | |
| 4,211,312 | 7/1980 | Nogami et al. . | |
| 4,380,971 | 4/1983 | Tholen et al. . | |
| 4,408,627 | 10/1983 | Harris . | |
| 4,553,648 | 11/1985 | Suzuki et al. . | |
| 4,557,233 | 12/1985 | Joppig et al. . | |
| 4,609,068 | 9/1986 | Backlund | 181/237 X |
| 4,669,585 | 6/1987 | Harris . | |
| 4,682,674 | 7/1987 | Schmidt | 137/599 X |
| 4,685,544 | 8/1987 | Takigawa et al. . | |
| 4,751,987 | 6/1988 | Takigawa et al. . | |
| 4,825,982 | 5/1989 | Yanagawa et al. . | |
| 4,856,624 | 8/1989 | Usui . | |
| 4,893,698 | 1/1990 | Suzuki . | |
| 4,903,802 | 2/1990 | Takigawa et al. . | |
| 4,917,221 | 4/1990 | Takigawa et al. . | |
| 4,987,869 | 1/1991 | Hilburger . | |
| 5,113,652 | 5/1992 | Baines et al. . | |

FOREIGN PATENT DOCUMENTS

| | | | |
|---|---|---|---|
| 2223535 | 4/1990 | United Kingdom | 181/237 |

*Primary Examiner*—Stephen M. Hepperle
*Attorney, Agent, or Firm*—Merchant, Gould, Smith, Edell, Welter & Schmidt

[57] ABSTRACT

An exhaust brake arrangement is provided for selective operation to facilitate braking of a vehicle such as an over-the-highway truck. The exhaust brake operates by selectively generating back pressure to the exhaust flow system, and thus drag on the engine and braking action. The exhaust brake arrangement includes pressure relief valve assembly which regulates the amount of exhaust back pressure build up to release same before design limits are exceeded. In addition the arrangement may include a bypass valve construction for selective positioning of the pressure relief valve assembly on line or off line, as may be desired.

11 Claims, 3 Drawing Sheets

EXHAUST SYSTEMS FOR MOTORIZED VEHICLES

FIELD OF THE INVENTION

The present invention generally concerns exhaust systems for internal combustion engines, such as diesel engines. It particularly concerns exhaust systems for diesel trucks or the like. According to the invention a preferred exhaust brake is provided for motorized vehicles. The exhaust brake is preferably positioned within a muffler system of the vehicle. Also, a preferred bypass valve arrangement for use with a variety of exhaust systems is provided.

BACKGROUND OF THE INVENTION

Exhaust brakes are known for over-the-highway trucks and similar vehicles. Such vehicles are generally powered by an internal combustion engine, often a diesel engine. Such engines displace exhaust under substantial pressure. If obstruction to displacement of exhaust is provided, the engine will operate less efficiently. Thus, blockage of exhaust flow tends to slow engine operation and act as a brake. For example, through utilization of an appropriate system to block exhaust flow from the truck engine, a truck driver can slow down the vehicle with less wear and strain on the braking system for the wheels.

A variety of conventional exhaust brakes are known. In general these comprise valves that place a restriction, for example a restricted orifice, of fixed size into or out of alignment with exhaust gas flow. The restriction provides a smaller passageway for the exhaust gases, and thus inhibits exhaust flow. This creates a back pressure, providing the braking action. Generally these systems are designed so that the maximum back pressure provided is within safe operating limits for the engine, to reduce risk of engine damage.

As the vehicle slows down, the engine output and exhaust output begin to slow down as well. Thus, the back pressure or braking action provided by the exhaust brake reduces in time. Typically a vehicle operator will down shift throughout the braking action, each down shift reestablishing a higher engine rate and thus increasing exhaust flow. The increase in exhaust flow which accompanies each down shift will provide renewal of back pressure and thus regenerate braking action if the exhaust brake is in position.

The typical exhaust brake is operated with an overriding on/off switch in conjunction with a throttle-activated switch. The controls are configured so that removing pressure on the throttle automatically triggers the exhaust brake switch, restricting the orifice and slowing down the engine. In some systems automatic operation is replaced with a manual control that is operated to restrict exhaust flow (or remove restriction of exhaust flow) at the selection of the operator.

Typically the exhaust brake is located at or near the exhaust manifold for the engine. Thus, it is near the source of exhaust.

It is a purpose of the present invention to provide for improved exhaust brake arrangements.

SUMMARY OF THE INVENTION

According to certain applications of the technology defined herein, an exhaust brake arrangement is provided for use with a motor vehicle such as over the highway truck. The exhaust brake arrangement is positionable within the exhaust gas flow for an engine of the vehicle, to selectively generate back pressure and braking action. In certain preferred applications, the exhaust brake is positioned within a muffler assembly, to conserve space. However, the principles and advantages of the present invention may be applied to, and be obtained by, exhaust brake arrangements not positioned within a muffler.

In general, exhaust brake arrangements according to the present invention include an exhaust flow passageway and a pressure relief valve assembly in operative association with the exhaust flow passageway. In certain preferred embodiments, a bypass valve construction and means for operating the bypass valve construction are also provided, to facilitate operation.

The pressure relief valve assembly includes means for pressure relief in response to build up of a selected amount of pressure in the exhaust flow passageway. When the pressure relief valve assembly is "on line" as defined herein, the relief valve is configured so that back pressure to the exhaust gas flow will build up, until a selected or defined pressure relief point is reached. At the pressure relief point, the pressure relief valve assembly will open, allowing pressure release. During the period of pressure build up, braking action from the exhaust brake is initiated. Indeed, even during pressure release a braking action will occur, since the pressure relief valve assembly is constructed and arranged to maintain a selected restriction to exhaust flow.

In certain embodiments, a bypass valve construction allows the pressure relief valve assembly to be selectively placed on line and off line. When the pressure relief valve assembly is off line, as defined herein, the exhaust gas flow bypasses the pressure relief valve assembly and build up of pressure (without control and regulation by the pressure relief valve assembly) does not occur. Thus, in general the bypass valve construction has first and second configurations, and, when the bypass valve construction is in the first valve configuration it is constructed and arranged to direct exhaust gas flow in a manner bypassing the pressure relief valve assembly and inhibiting build up of pressure within the exhaust flow passageway. On the other hand, when the bypass valve construction is in the second valve configuration, it is constructed and arranged to inhibit exhaust gas flow, from the exhaust gas flow passageway, except as controlled and regulated by the pressure relief valve assembly, i.e. it provides that the pressure relief valve assembly is on line for regulating operation.

Selected exhaust brake arrangements according to certain applications of the present invention include means for selectively configuring the bypass valve construction in each of the first and second configurations.

It is an advantage of preferred exhaust brake constructions according to the present invention that they may be placed within a muffler assembly of a motor vehicle. In particular, in some embodiments the exhaust flow passageway will comprise an inlet to a muffler assembly; and, the pressure relief valve assembly will include valve components operably positioned within the muffler assembly.

Preferably the pressure relief valve assembly comprises a valve head and valve seat arrangement, having open and closed orientations. In the closed orientation the valve head is biased against the valve seat to close same to the passage of exhaust gases therethrough. When the pressure relief valve assembly is on line and in the closed orientation, exhaust gas build up and braking action will occur. In addition, when the pressure relief valve assembly is on line and in the open orientation, the valve head is biased away from the valve seat, allowing exhaust gas flow therethrough, limiting maximum exhaust line pressure. When the pressure relief valve assembly is on line, it will typically only open in response to a selected pressure limit having been achieved (or exceeded) in the exhaust gas flow. Even when the valve assembly is on line and open, braking action occurs, however, pressure build-up is limited to a selected maximum.

In those embodiments in which the pressure relief valve assembly can be taken off line, the normal orientation for the pressure relief valve assembly when off line is closed. Thus, immediately upon being placed on line the pressure relief valve assembly will be closed and pressure build up, i.e. braking will occur.

In preferred arrangements, the valve seat comprises a frusto-conical seat having one end of a first diameter and a second end of a second, smaller, diameter. The valve head comprises of a piston head having a frusto-conical shape and an outer sealing surface oriented for sealing engagement with the valve seat. This provides for preferred operation as described hereinbelow.

A variety of biasing arrangements may be provided which are constructed and arranged to bias the valve head against the valve seat to close same under a closing pressure, but which also allow opening under a selected relief (or opening) pressure. That is, in general the valve head is biased against the valve seat under the selected relief pressure, so that when the relief pressure is exceeded by pressure build up within the exhaust flow passageway, the valve head will be biased away from the valve seat to prevent an over pressure condition. In one preferred embodiment described and shown the biasing arrangement comprises a coiled spring. In another it comprises a pneumatic piston construction, which can be adjusted for various relief pressures.

A variety of bypass valve constructions may be utilized in the arrangements according to the present invention. Several arrangements comprising concentric tube constructions are shown. Such arrangements generally comprise first and second tubular members, with a portion of the first tube positioned within a portion of the second tube, i.e. with the tubes aligned concentrically or with their central longitudinal axes coaxial. The tubes include appropriate apertures therein for positioning in open and closed flow pathways. Movement of the two tubes relative to one another (or one tube relative to the other) can be utilized to selectively open and close apertures and control flow. In one of the arrangements shown in the drawings, one of the tubes is radially moveable relative to the other, to achieve opening and closing, i.e., bypass or non-bypass flow. In another of the arrangements described and shown, one tube is longitudinally moved relative to the other, to achieve opening and closing, i.e., bypass flow. Specific preferred arrangements wherein the outer tube is moveable and the inner tube is stationary are shown. In addition, preferred actuation means for movement of one tube relative to the other are described.

In certain preferred embodiments the pressure relief valve assembly is mounted on the inner tube of a concentric tube construction. This positions the pressure relief valve assembly in a preferred location for operation.

According to certain applications of the present invention, a muffler assembly is provided which includes an outer shell having acoustical constructions therein for sound attenuation; and, an exhaust brake arrangement. The exhaust brake arrangement may be as generally described above. Also, according to certain applications of the present invention the muffler assembly may include therein a core such as a particulate trap or catalytic convertor core, for further operation on the exhaust gases.

According to the present invention a preferred method of braking a vehicle having an exhaust system with a muffler assembly is provided. The method generally comprises a step of positioning a pressure relief valve assembly within the muffler assembly (in operative association with the muffler assembly) such that when on line the pressure relief valve assembly will only allow the gases to flow past the relief valve after a build up of exhaust gas pressure upstream of the pressure relief valve assembly above a point of relief pressure. The effect of placing the pressure relief valve assembly on line is to allow for pressure build up and thus the exhaust brake action. Of course, the relief pressure typically will be set such that it is within the safety limits for the engine and vehicle involved, and thus potentially damaging back pressure in the exhaust line is not developed.

The drawings constitute a part of this specification and disclose certain exemplary embodiments. In the drawings relative component sizes and material thicknesses may be shown exaggerated, to facilitate an understanding of the invention. It will be understood that the invention may be applied in a variety of embodiments in addition to those illustrated in the drawings.

DETAILED DESCRIPTION OF THE INVENTION

Detailed descriptions of arrangements according to the present invention are described herein. The descriptions are presented with respect to the exemplary embodiments depicted in the Figures. The descriptions and embodiments depicted are intended to be exemplary of the principles of the present invention, which may be applied in various alternative forms, embodiments or manners.

The Exhaust Brake

Figure 1:
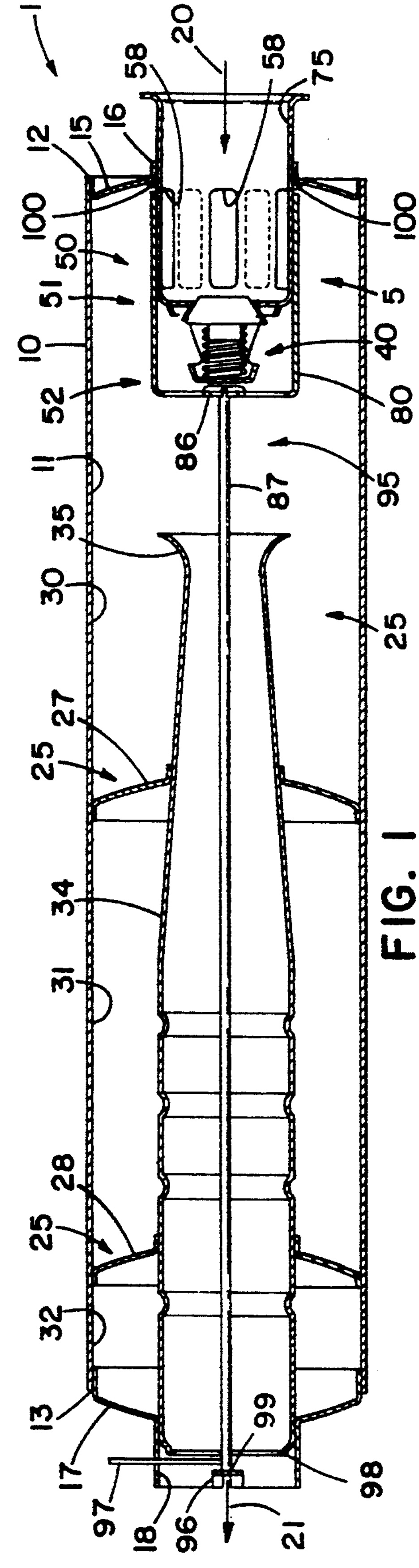
FIG. 1 is a side cross-sectional view of a muffler assembly including an exhaust brake according to the present invention.
Figure 2:
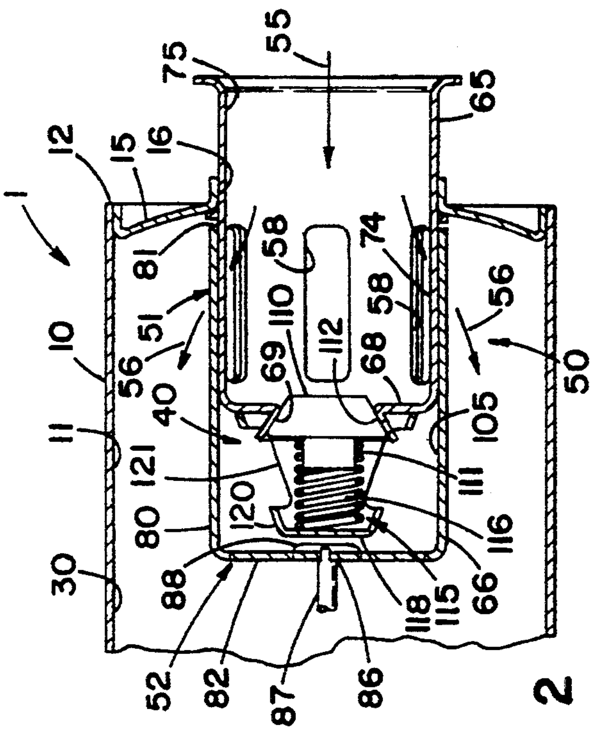
FIG. 2 is an enlarged fragmentary view of a portion of the arrangement shown in FIG. 1; the exhaust brake of FIG. 2 being shown in an off line or non-braking orientation.
Figure 3:
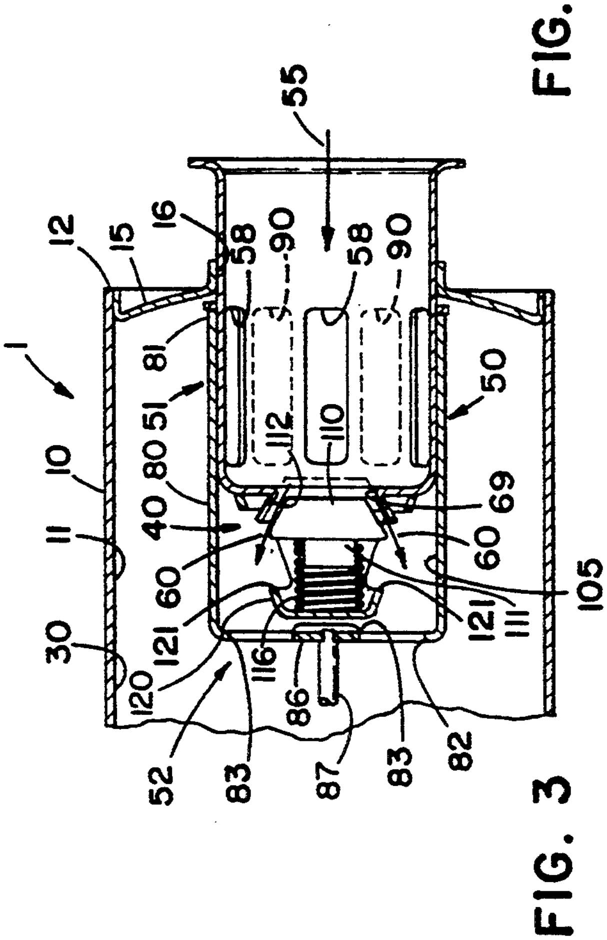
FIG. 3 is an enlarged fragmentary view generally analogous to FIG. 2; the exhaust brake of FIG. 3 being shown on line an open.
Figure 5:
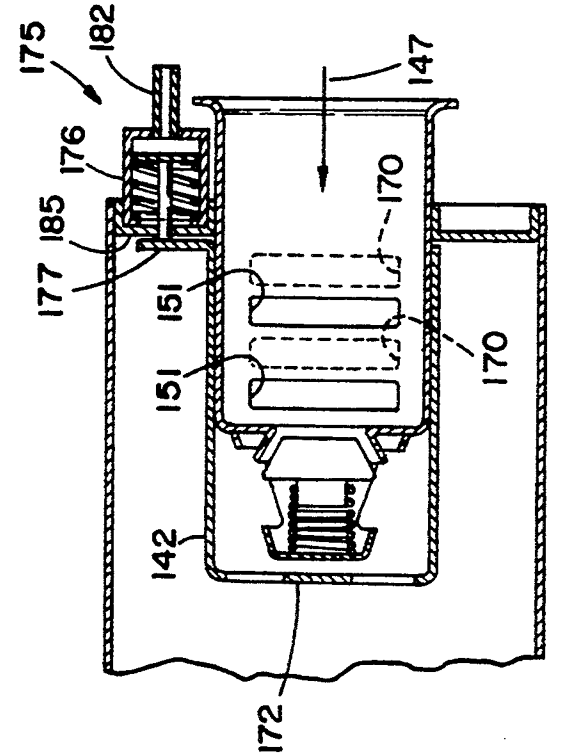
FIG. 5 is an enlarged fragmentary view generally analogous to FIG. 4, but showing the exhaust brake in an on line and open orientation.
Figure 4:
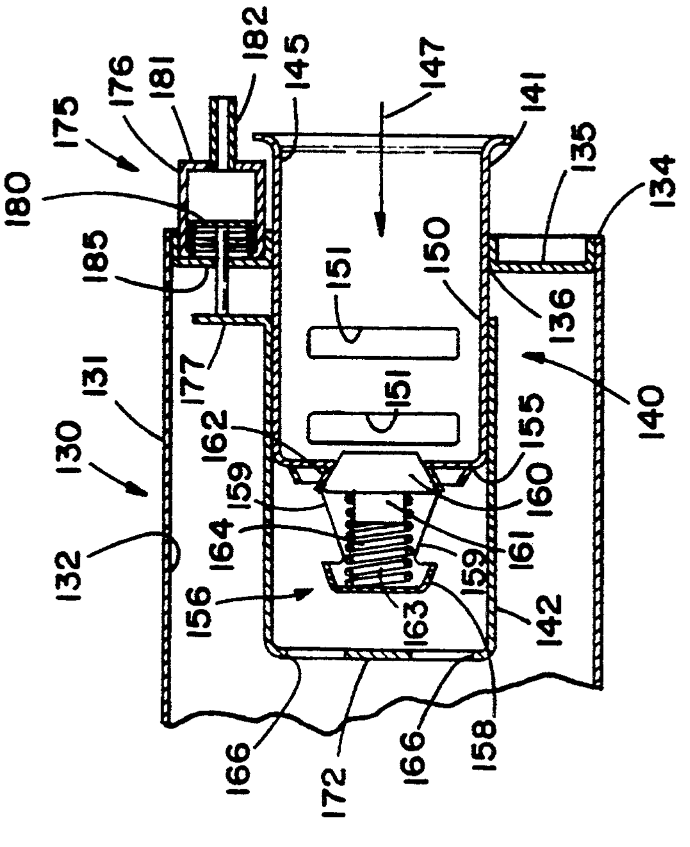
FIG. 4 is an enlarged fragmentary view of an arrangement analogous to FIG. 2, but showing an alternate embodiment of an exhaust brake.

Exhaust brakes according to the present invention are depicted in FIGS. 1–7. Of these figures, FIGS. 1–3 depict a first embodiment; FIGS. 4 and 5 a second embodiment; and, FIGS. 6 and 7 a third embodiment.

The Embodiment of FIGS. 1–3

In general, exhaust brakes according to the present invention are specifically adapted to be utilized, if desired, within a muffler assembly for an exhaust system. Thus, they may be installed in conventional systems such as diesel-powered trucks, through replacement of the muffler assembly thereof with a muffler assembly including an exhaust brake as described herein. This is advantageous for efficient utilization of space and for efficiency of assembly and installation. It is noted that since use of a construction according to the present invention may involve development of substantial line pressure upstream from the exhaust brake, exhaust tubing and connectors upstream from the assembly may need to be reinforced or modified. Conventional techniques for improving tubing and connectors to withstand increased flow/pressure may be used to accomplish this.

It is noted that arrangements according to the present invention may be utilized outside of a muffler assembly. However, it is an advantage of arrangements according to the present invention that they can be positioned within the muffler location, and indeed the muffler body, for a truck. For example, adaptability for positioning within a muffler location means that extra space in and around the truck engine is not needed, for installing the exhaust brake. Further, extra joints or connections are not needed if the exhaust brake is positioned within the muffler. A muffler location is also a cooler location, that is the exhaust has cooled somewhat before it reaches the muffler, and thus, lower cost materials can be utilized for the components of the exhaust brake. Further, in some preferred designs, the valve components can be generated to serve an acoustic function, and to facilitate muffler operation. Finally, the muffler is a lower pressure environment than environments immediately near the exhaust manifold of the engine. Thus, mechanical access to the components of the exhaust brake system, for example, by operating controls and the like, can be made through the walls or side of the muffler without the need for special seals and the like, to handle a substantial pressure differential.

Arrangements for exhaust brakes that are utilized within muffler assemblies are shown in all of FIGS. 1–7. A first, preferred, embodiment is depicted in FIGS. 1–3.

The reference numeral 1, FIG. 1, generally depicts a muffler assembly including an exhaust brake arrangement 5 according to the present invention. The muffler assembly 1 comprises an outer casing or shell 10 defining an internal exhaust flow passageway 11. Shell 10 has an inlet end 12 and an outlet end 13. Cover 15 is positioned at inlet end 12; cover 15 defining central aperture 16 therein. End cover 17 is positioned at outlet end 13; end cover 17 defining outlet aperture 18.

In operation, the exhaust gases flow into muffler assembly 1 along the path generally indicated at arrow 20, i.e. through inlet aperture 16. The gases pass through exhaust flow passageway 11 and outwardly therefrom through outlet 18, as indicated at arrow 21. Within shell 10 sound attenuation and any other operation on the exhaust gases (such as particulate removal or catalytic conversion) as may be desired is conducted. For the arrangement illustrated on FIG. 1, sound attenuation means is provided within shell 10, but no particulate removal or catalytic conversion arrangement is depicted.

Referring to FIG. 1, sound attenuation within muffler assembly 1 is provided by acoustical constructions indicated generally at 25. Acoustical constructions 25 may be of any of a variety of types. The particular ones depicted in FIG. 5 comprise baffles 27 and 28, which define resonating chambers 30,31 and 32; and, outlet tube 34 which, in part through operation of narrow neck 35, facilitate sound attenuation. Acoustical constructions such as those depicted at 25 in FIG. 1 are well known and, except as they may be modified to accommodate exhaust brake systems and the like according to the present invention, conventional arrangements may be utilized in muffler assemblies 1 according to the present invention.

Still referring to FIG. 1, as indicated above, an exhaust brake arrangement 5 is operationally positioned within muffler assembly 1. For the embodiment shown, exhaust brake arrangement 5 is depicted generally upstream (with respect to exhaust flow) of acoustical elements or constructions 25. In particular, exhaust brake arrangement 5 is depicted generally mounted within (and adjacent to) upstream or inlet end 12 of shell 10.

Exhaust brake arrangement 5 generally includes means for selectively positioning a pressure relief valve construction or assembly 40 into the exhaust flow stream entering muffler assembly 1. Herein when the pressure relief valve assembly 40 is described as "on line," it is meant that exhaust flow through muffler assembly 10 is controlled or regulated by the pressure relief valve assembly 40. More specifically, when the pressure relief valve assembly 40 is "on line" exhaust flow through shell 10 is substantially inhibited unless and until the inlet exhaust gas pressure exceeds the pressure limit (or control limit) of the pressure relief valve assembly 40.

Certain exhaust brake arrangements 5 according to the present invention may be positioned with the pressure relief valve assembly 40 thereof in an "off line" mode. When the pressure relief valve assembly is "off line", it is meant that exhaust flow bypasses the pressure relief valve assembly 40. That is, exhaust flow through the muffler assembly 1 is not controlled or regulated at the relief valve assembly 40. Alternately stated, when assembly 40 is "off line", control of the passage of exhaust gasses through shell 10 is not provided by the pressure relief limit of the pressure relief valve assembly 40.

Means for selectively placing pressure relief valve assembly 40 "on line" or "off line" (or changing the pressure relief valve assembly 40 from one to the other) is indicated generally at reference numeral 50. A variety of such means are illustrated in the various embodiments of FIGS. 1–5. Although tube-in-tube valves are shown, still other valve arrangements could be used. For the embodiments of FIGS. 1–3, means 50 for placing assembly 40 "on" or "off" line comprises inlet valve construction 51 including control arrangement 52.

Before specific detail concerning inlet valve construction 51 is provided, a brief description of operation is indicated. Referring to FIG. 2, arrangement 1 is depicted with pressure relief valve assembly 40 off line, through selective operation of inlet valve construction 51. When in the mode or configuration of FIG. 2, exhaust gases flowing into shell 10 along the path indicated by arrow 55 bypass construction 40 along the path indicated by arrows 56 and flow into chamber 11. Thus, exhaust gas flow bypasses pressure relief value assembly 40 and is not regulated thereby.

In contrast, FIG. 3 depicts muffler assembly 1 with pressure relief valve assembly 40 on line. As gases enter along line 55, they are directed against pressure relief valve assembly 40. If the release (or relief) pressure of pressure relief valve assembly 40 is overcome by the exhaust gas pressure, pressure relief valve assembly 40 will open and the gases will pass therethrough. In FIG. 3 pressure relief valve assembly 40 is depicted on line and open, with exhaust gases allowed to pass therethrough along the path indicated by arrows 60. To position pressure relief valve assembly 40 selectively on line, inlet valve construction 51 of FIG. 3 has been manipulated to close apertures 58 to the passage of exhaust gases therethrough.

From the above description, it will be apparent that the pressure relief valve assembly 40 has an "open" and a "closed" orientation, configuration or mode. When the pressure relief valve assembly 40 is on line and in the closed orientation, exhaust gas pressure upstream from the pressure relief valve assembly 40 is insufficient to cause the valve to open as indicated in FIG. 3 for the passage of exhaust gases therepast. The general orientation of pressure relief valve assembly 40, when the pressure relief valve assembly is off line, is of course the closed orientation as indicated in FIG. 2. The pressure relief valve assembly 40 will generally be in the closed orientation even when the pressure relief valve assembly 40 is on line, if the exhaust gas pressure build up upstream of the pressure relief valve assembly 40 is not sufficient to overcome the relief pressure relief point of the valve assembly 40. This is will be described in greater detail herein below.

Before a detailed description of the pressure relief valve assembly 40 is presented, further examination of the inlet valve construction 51 will be made. Referring to FIG. 2, inlet valve construction 51 includes inlet tube 65 and outer cover tube 66. Inlet tube 65 is mounted within inlet aperture 16, and defines the pathway for introduction of exhaust gases into shell 10, as indicated by arrow 55. Inlet tube 65 includes an end 68 with an aperture 69 therein selectively opened and closed by pressure relief valve assembly 40.

Still referring to FIG. 2, a portion 74 of inlet tube 65 projecting inwardly of inlet end cover 15 includes at least one aperture 58 therein, allowing exhaust flow communication between an interior 75 of tube 65 and volume 11 of muffler assembly 1. For the arrangement depicted in FIG. 2, portion 74 of inlet tube 65 includes six apertures 58 (only three being shown in FIGS. 1,2 and 3 due to the view in cross-section). For the preferred embodiment shown, apertures 58 are evenly, radially, spaced around a circumference of portion 74. For the particular embodiment depicted in FIGS. 1–3, each of apertures 58 is somewhat rectangularly shaped, however alternate shapes are possible.

Still referring to FIG. 2, outer tubular cover 66 comprises a tubular member 80 having an upstream end 81 and a downstream end 82. Referring to FIG. 3, end 82 includes exhaust flow apertures 83 therein, which may be used for escape of gases as they pass through pressure relief valve assembly 40. End 82 also includes a central portion 86. Control rod 87 is attached to central portion 86 by fastener or weld 88, FIG. 2.

Tubular member 80 is sized to snugly receive portion 74 of inner tube 65 therein. Outer cover 66 (and in particular tubular member 80), is rotatable relative to inlet tube 65. In particular, each of inlet tube 65 and tubular member 80 defines a central longitudinal axis, the two longitudinal axes being coaxial with one another. Tubular member 80 is rotatably mounted over portion 74 of inlet tube 65.

Referring to FIG. 3, tubular member 80 includes a plurality of apertures 90; each one of the plurality of apertures 90 being positioned for alignment with a corresponding one of the apertures 58 in inlet tube 65. Preferably each of apertures 90 is sized and radially spaced such that tubular member 80 can be rotated to align each one of apertures 90 with a corresponding one of the apertures 58 as shown in FIG. 2. When tubular member 80 is selectively rotated for alignment between apertures 90 and apertures 58, as shown in FIG. 2, the inlet valve construction 51 is oriented such that the pressure relief valve assembly 40 is off line. That is, exhaust gas flow can bypass valve assembly 40.

Preferably apertures 58 and apertures 90 are also sized and spaced such that tubular member 80 can be rotated to close apertures 58 to the passage of exhaust gas therethrough, as indicated in FIG. 3. In particular referring to FIG. 3, apertures 58 and 90 are sized and spaced such that when it is selectively rotated an appropriate amount relative to its orientation of FIG. 2, the tubular member 80 is aligned to close each of apertures 58. When tubular member 80 is so oriented, the inlet valve construction 51 is oriented such that pressure relief valve assembly 40 is on line.

Selective rotation of tubular member 80, and thus control of inlet valve construction 51, is provided by control assembly 95, in particular control rod 87. Referring to FIG. 1, control assembly 95 includes an arrangement wherein control rod 87 extends substantially from plate 86 to outlet end 13 of shell 10. At outlet end 13 the control rod abuts stop 96. Lateral control arm 97 is positioned to extend exterior of tube 18, at end 13 of shell 10. Movement of control arm 97 through an arc selectively rotates tubular member 80 and thus controls inlet valve construction 51. A variety of means, not shown, may be utilized to actuate control arm 97, including for example an electrical solenoid actuator, or a pneumatic piston actuator, and link arm arrangement or the like.

Still referring to FIG. 1, it will be observed that lateral control arm 97 is positioned on rod 87 at a position that is downstream from flange 98. Flange 98 operates as an aspirator, generating a low pressure location where arm 97 passes through the housing. Thus, the aspirator or flange 98 facilitates exhaust flow through the outlet by inhibiting leaks of exhaust gases through any other portion of the assembly.

It will be understood that in some selected orientations or modes tubular member 80 may be under vibration or other forces likely to generate movement. Member 80 is maintained in an appropriate position, axially or longitudinally, relative to the inlet tube 65, through mechanical means. In particular, end 99 of control rod 87 abuts plate 96 as described. Thus, tubular member 80 is prevented from moving toward end 13. Movement toward end 15 is inhibited by a mechanical stop arrangement, indicated at 100.

For the embodiment depicted in FIGS. 1-3, the pressure relief valve assembly 40 is mounted on inlet tube 65, and is positioned within volume 105 defined by tubular member 80. Pressure relief valve assembly 40 generally comprises a valve head, piston or seal member 110 orientated for sealing engagement within aperture 69 of inner tube 65. Valve head 110 is mounted upon piston 111. Piston 111 is longitudinally moveable to allow head 110 to be orientated against valve seat 112 (defined in aperture 69) and alternatively to be moved therefrom (to open the valve seat 112). A comparison of closed and open orientations to valve seat 112 (or aperture 69) is indicated by comparison of FIGS. 2 and 3.

Piston 111 and valve head 110 are generally biased against valve seat 112 by biasing means 115. For the arrangement shown in FIGS. 1-3, the biasing means 115 comprises spring 116. The spring 116 is positioned in compression between valve head 110 and end plate 118, FIG. 2. When the force of spring 116 (i.e. resistance to further compression) is overcome by pressure in inlet tube 65, FIG. 3, the spring 116 further compresses allowing the pressure to bias valve head 110 away from valve seat 112, opening same. When the pressure build up in inlet tube 65 is below the biasing pressure of the spring, FIG. 2, the spring 116 will bias the valve head 110 against valve seat 112, closing the valve. The force of the spring 116 may be selected to provide for opening of the pressure relief valve assembly 40 under selected control pressures, for most desired exhaust braking. It is foreseen that for a typical diesel engine substantial braking effect can be obtained if a back pressure in inlet tube 65 of at least about 10–20 psi can be obtained. The biasing means 115 and valve head 110/valve seat 112 design will preferably be selected such that a pressure in excess of at least about 20 psi will be needed for the pressure relief valve assembly 40 to open. Typically a diesel engine can withstand to up to about 60–70 psi back pressure. Such values would represent, for most applications, the uppermost limit that would be selected for operation of the pressure relief valve assembly 40. That is, the basic purpose of the pressure relief valve assembly 40 is to allow as much build up of pressure as is safe and reasonable to maximize braking effect, but also to allow an immediate pressure relief should that limit be exceeded, for protection of the engine.

With respect to pressure build up, an advantage is provided by positioning the exhaust brake at the inlet end of the muffler assembly. In particular, when the exhaust brake is on line and pressure build up occurs upstream of the exhaust brake, pressure build up within the acoustical chambers of the muffler assembly 1 is avoided. Thus, special materials, seals, etc. downstream from the exhaust brake, to withstand pressure within the muffler assembly, are avoided.

Still referring to FIGS. 1-3, it is noted that in some instances the exhaust brake arrangement may be designed to provide some acoustic attenuation. Thus, it may be specifically designed to facilitate operation of the muffler.

Still referring to FIG. 2, pressure relief valve assembly 40 includes cover 120 positioned on end wall 68. Cover 120 includes valve head 110, piston 111, spring 116, and valve seat 112 contained therein. The cover 120 includes gas flow aperture 121 therein. As indicated in FIG. 3, when pressure relief valve assembly 40 is open, exhaust gases can pass through aperture 69 and inlet tube 65, underneath cover 120 and outwardly therefrom through apertures 121. As indicated above, gas flow outwardly from volume 105 is provided by apertures 83 at end 82 of tubular member 80.

General performance and operation of muffler assembly 1 is as follows. Referring to FIG. 2, assembly 1 is depicted as it would be configured for normal operation of the truck or other motorized vehicle. Exhaust gases enter the muffler along path 55 and by passage along path 56 they enter the interior 11 of the shell 10. The exhaust gases move through the shell 10 toward end 13, FIG. 1, and escape through outlet 18 as indicated at arrow 21. Within shell 10, acoustics 25 lead to sound attenuation. If desired a core such as a catalytic converter or a particulate trap, not shown, could be positioned within shell 10 to effect modification of the exhaust gases.

When the operator of the motor vehicle wishes to have the exhaust brake engaged, the inlet valve construction 51 is operated to rotate the tubular member 80 to the orientation shown in FIG. 1, i.e. with apertures 58 blocked. Mechanical stops or a variety of other controls can be used to ensure proper alignment of apertures (for closure). Exhaust gas pressure will now build up in region 75, FIG. 1. This build up of pressure or back pressure to the engine will perform a braking function on the engine and thus the vehicle.

Should the back pressure exceed the pressure control limit for pressure relief valve assembly 40, the pressure relief valve assembly will open, FIG. 3, allowing pressure relief through aperture 69, as indicated at arrow 60. When the pressure in volume 75 reestablishes below the point of pressure relief, spring 116 will bias valve head 110 against valve seat 112 closing the pressure relief valve and reestablishing the orientation shown in FIG. 1. When the operator chooses to disengage the exhaust brake; i.e. take pressure relief valve assembly 40 off line, the operator selectively rotates tubular member 80 to the orientation of FIG. 2. Of course even when the pressure relief valve assembly 40 is off line, should a pressure build up in the exhaust line over the relief limit occur, the valve assembly 40 will open. It is foreseen that in typical applications, this latter condition will never be encountered, since the muffler assembly 1 is open for passage of exhaust gases therethrough. Thus, when the pressure relief valve assembly 40 is off line, and bypass is permitted, the assembly 40 is not referred to herein as "regulating" exhaust gas flow.

As described above, selective rotation of tubular member 80 can be conducted through rotation of control rod 87 (and for the arrangement shown in FIGS. 1-3 movement of control arm 97, FIG. 1).

A variety of means (not shown) may be utilized to effect control of the position of arm 97. For example, a switch controlling a solenoid or other actuator mechanism may be utilized, with the switch positioned where it could be readily engaged by the operator of the vehicle. In the alternative, the arrangement could be constructed to automatically set the pressure relief valve assembly on line whenever the throttle is disengaged (or if desired when the brake pedal is engaged).

Various means may be utilized to allow for sufficiently precise positioning in rotation of the tubular member 80. It is foreseen that mechanical stops and the like either positioned on the member 80 or associated with control arm 97 will generally be preferred. All that is required is to ensure reasonable alignment of tubular member 80 (relative to inlet tube 65) in each of the two extreme rotational positions.

Certain advantages of certain preferred constructions according to the present invention will be understood by comparison of FIGS. 1 and 3. In general, the higher the pressure within region 75, the further back valve head 110 will be displaced, FIG. 3, when the pressure limit of pressure relief valve assembly 40 is exceeded. As the pressure decreases, valve head 110 will be pressed closer and closer to valve seat 112, rendering the size of the volume around the valve head 110, through which exhaust gases can escape, smaller and smaller. This will, in effect, tend to increase the rate of build up of back pressure. Thus, to some extent the system can be constructed to be self-adjusting; i.e. a smaller escape aperture is provided for lower flow circumstances. Unlike conventional systems (in which a restricted orifice of a fixed size is put on line or taken off line) the present system allows for the size of the restricted orifice to be automatically modified, depending upon the flow in the exhaust line. Also, the valve of the present invention provides regulation, rather than simply restriction.

It is foreseen that in some applications it may be desirable to have a control rod 87, FIG. 1, which extends substantially the entire length of shell 10 to end 13, from tubular member 80. From a review of FIGS. 1, 2 and 3, it will be understood that alternate control means such as linkages not extending the lateral length of device 10 could be utilized. The arrangement of FIG. 1 is advantageous, since access to control rod 87 from exterior of the system is provided downstream of shell 10 and acoustics 25. However, with appropriate mechanical linkages and seals, alternate systems could be readily constructed.

It is foreseen that if the exhaust brake assembly completely blocks all flow of exhaust into the muffler, and if the exhaust brake was inadvertently put on line while the engine was idling and the truck was at a stop, it might generate a stall. For this reason, it may be desirable to provide for some "leak" or "bypass" of the valve arrangement, even when the relief valve assembly is "on line". This can be readily accomplished by providing for less than complete blockage of the passageways 58. Alternatively, a bypass hole or the like can be utilized in the assembly. It is foreseen that in many applications sufficient leakage between the two tubes of the flow bypass arrangement will be sufficient, to provide for enough leakage to inhibit the likelihood of stall under these circumstances.

For the arrangements depicted in FIGS. 1–3, the inner tube 65 was anchored stationary, and the outer tube 80 was made moveable. It is foreseen that in some applications an alternate construction is possible, wherein the inner tube is moveable and the outer tube is stationary. The arrangement depicted, however, is preferred since the inner tube 65 takes the thrust or force from exhaust, when it is closed, and the outer tube does not receive that thrust. Thus, a thrust bearing or similar arrangement for the moveable tube 80, is not needed.

Arrangements according to the present invention provide many advantages relative to conventional restricted orifice exhaust brakes. For example, arrangements according to the present invention operate to maintain a selected maximum back pressure, even as the vehicle slows down, without the necessity of as many gear shifts by the driver. Since the driver does not need to conduct as many down shifts, to maintain engine speed for braking effect, the present system is easier for the driver to utilize and results in less stress on various vehicle components such as clutches, u-joints, differentials, etc.

The Embodiment of FIGS. 4 and 5

For the embodiment of FIGS. 1–3, means 50 (for positioning the pressure relief valve assembly 40 selectively on-line or off-line) included: an inlet valve construction 51 comprising two tubular members 65 and 80, one received within the other; and, means for rotating one tubular member relative to the other, in order to obtain an opening or closing of the inlet valve construction 51. It is foreseen that in some constructions, alternate modes of actuation of the inlet valve construction may be provided. In particular, it is foreseen that lateral movement, rather than radial movement, of two pieces relative to one another may be utilized to effect selective positioning of the pressure relief valve assembly on-line or off-line. An example of such a construction is illustrated in FIGS. 4 and 5.

Referring to FIG. 4, muffler assembly 130 is depicted in fragmentary. In particular, downstream acoustic arrangements and an outlet are not shown. A variety of such arrangements may be utilized in association with the system of FIGS. 4 and 5, including those depicted in FIG. 1.

Still referring to FIG. 4, muffler assembly 130 comprises shell 131 which defines internal volume 132. Shell 131 includes upstream end 134 having inlet end cap 135 positioned therein. Inlet end cap 135 defines a central aperture 136.

For the arrangement shown in FIG. 4, inlet valve construction 140 is positioned adjacent inlet end cap 135. Inlet valve construction 140 generally comprises inlet tube 141 and cover (tubular) member 142.

Inlet tube 141 is mounted within aperture 136 of inlet end cap 135. Inlet tube 141 defines internal passageway 145 oriented to receive therein exhaust gases passing into muffler assembly 130 along the path generally indicated by arrow 147. Inlet tube 141 includes a portion 150 thereof projecting inwardly of volume 132 from end cap 135. Portion 150 includes at least one and preferably a plurality of apertures or slots 151 therein, for passage of exhaust gases, selectively, therethrough in a manner generally analogous to the passage of gases through slots 58 of the embodiment shown in FIGS. 1–3.

Similarly to the construction of FIGS. 1–3, inlet tube 141 includes an end cover 155 having pressure relief valve assembly 156 mounted thereon. Pressure relief valve assembly 156 generally comprises cover 158 with apertures 159 therein. Within cover 158 is positioned valve head 160, piston 161, valve seat 162 and biasing means 163 (comprising spring 164). The pressure relief valve assembly 156 is generally constructed and configured to operate analogously to pressure relief valve assembly 40 of the embodiment shown in FIGS. 1–3. That is, if apertures 151 of inlet tube 141 are blocked, pressure will build up in volume 145 for a braking effect on the engine. If the pressure within region 145 exceeds the relief pressure of pressure relief valve assembly 156, valve head 160 will be moved away from seat 162, allowing escape of gases through valve seat 162 and aperture 164. Escape outwardly from under outer tube cover 142 is provided by apertures 166.

Analogously to the arrangement illustrated in FIGS. 1–3, the outer tube cover 142 of the embodiment illustrated in FIGS. 4 and 5 includes a plurality of apertures 170, FIG. 5, therein which can be selectively aligned with apertures 151. Alignment is illustrated in FIG. 4. When the apertures 170 and 151 are aligned as illustrated in FIG. 4, the pressure relief valve assembly 156 is off line in a manner analogous to that described with respect to FIG. 2. Thus, as illustrated in FIG. 4, exhaust gases entering the system along the path of 147 can pass through apertures 151 and into volume 132. Under such circumstances, there will not be a build up in pressure within volume 145, generally, to lead to operation of pressure relief valve assembly 156. This is an "off line" mode according to previously provided definitions.

For the embodiments of FIGS. 4 and 5, the apertures 151 in the inlet tube 141 and the apertures 170 in the outer cover 142 are oriented such that relative movement of the inlet tube 141 and outer cover 142, between on-line and off-line modes, is a longitudinal rather than radial movement. That is, for the embodiment of FIGS. 1–3, the positions of the inlet tube and outer cover (65 and 66, respectively) are rotated relative to one another in order to open and close apertures 58 to passage of exhaust gases therethrough; whereas for the embodiment of FIGS. 4 and 5, the positions of the inlet tube 141 and outer cover 142 are moved longitudinally (or alternately stated "axially") relative to one another to achieve opening and closing of apertures 151 to movement of exhaust gases therethrough. This will be understood by comparison of FIGS. 4 and 5. In particular, for the embodiment shown, the inlet tube 141 is mounted stationary and outer cover 142 is mounted thereover in a manner allowing for sliding movement. In FIG. 4, the outer cover is oriented such that its apertures 170 align with apertures 151, opening apertures 151 to passage of exhaust gases therethrough. In FIG. 5, the arrangement 130 is depicted with outer cover 142 slid (on inlet tube 141) sufficiently so that apertures 151 are blocked.

For the particular embodiment depicted in FIGS. 4 and 5, the apertures 170,151 are positioned such that blockage of apertures 151 is accomplished by moving tube 142 so that its rear wall 172 is pulled toward pressure relief valve assembly 156 and rear wall 155 of inlet tube 141 (to achieve closure of apertures 151 or an "on-line" status for the pressure relief valve assembly 156).

A variety of actuation means may be utilized to accomplish the selected movement of the outer cover 142 and inlet tube 141 with respect to one another. For example, a control rod attached to rear wall 172, somewhat analogously to the arrangement shown in FIG. 1–3 but configured for longitudinal rather than radial movement, can be utilized. For the embodiment shown in FIGS. 4 and 5, however, an arrangement allowing for control of movement from mechanical means (which is closely associated with end 134 of shell 131) is provided.

In particular, referring to FIGS. 4 and 5, the control arrangement for selectively moving the cover 142 between its first extreme orientation (FIG. 4) and its second extreme orientation (FIG. 5) is indicated generally at 175. Control mechanism 175 generally comprises actuator system 176 and control arm 177. Control arm 177 is mounted on, and for the preferred embodiment is integral with, cover tube 142. Control arm 177 is engaged by the actuator system 176; selective movement in the actuator system 176 causing movement of control arm 177 and, as a result, movement of cover tube 142.

For the embodiment described as shown, actuator 176 comprises a piston 180 and piston chamber 181. Selected movement in the piston 180, through mechanical linkage, causes controlled movement of a control arm 177. Movement of the piston 180 can be controlled by pressure line 182, through hydraulic or pneumatic means. Return spring 183, FIG. 5, ensures proper positioning of piston 180. Alternatively, a double action piston, not shown, can be utilized. Appropriate mechanical alignment and means to inhibit jamming, can be readily provided.

It will be understood that a variety of alternatives to the particular actuator system 176 depicted could be utilized, including solenoid mechanisms and various other mechanical electro-mechanical hydraulic or pneumatic systems. In general, what is required is a system that allows for sufficient control of movement of arm 177 to achieve the desired operation of inlet valve construction 140. For the arrangements shown in FIGS. 4 and 5, mechanical stops are provided, to insure proper movement of the cover tube 142. For the extreme position of FIG. 4, the mechanical stop comprises a mechanical blockage to further movement of the piston 180 away from the control line 182. For the extreme position reflected in FIG. 5, mechanical stops also comprise means preventing further movement of the cover tube 142 toward the inlet tube 141. For the particular embodiment shown, this comprises end wall 185 of chamber 181, which is abutted by control arm 177.

In general, operation of the embodiment described in FIGS. 4 and 5 may be as generally described for the embodiment of FIGS. 1–3. Effective exhaust braking action can be obtained. Preferred valve seat and valve head configurations may be selected, to obtain advantages previously described.

Figure 7:
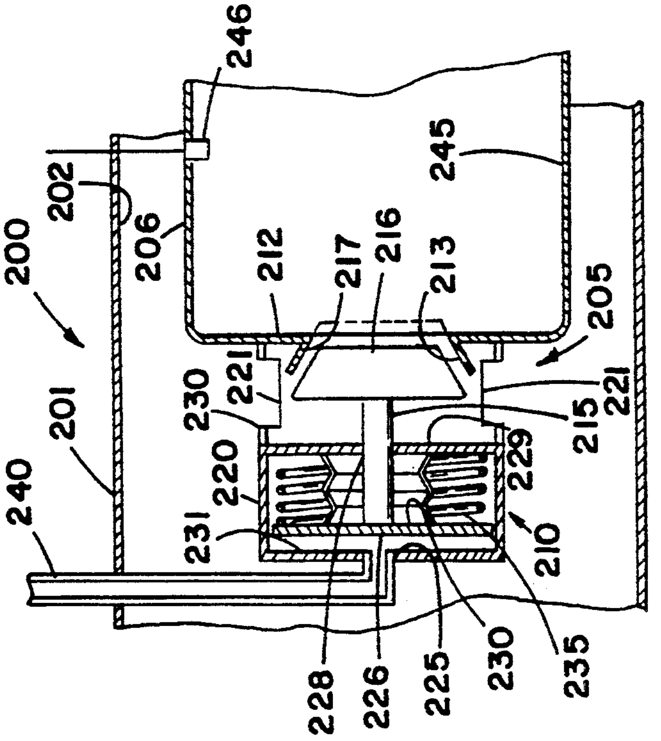
FIG. 7 is an enlarged fragmentary view generally analogous to FIG. 6, showing the exhaust brake with a pressure relief valve assembly thereof in an open configuration.
Figure 6:
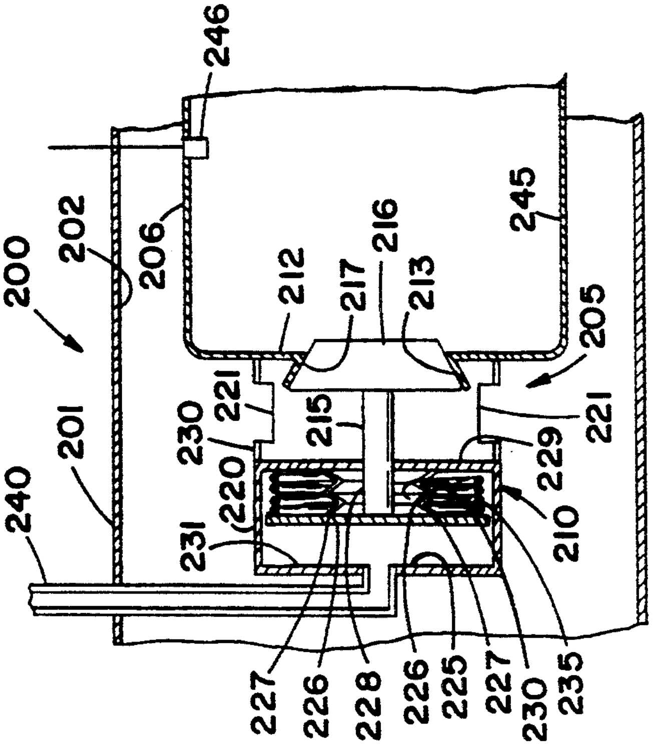
FIG. 6 is an enlarged fragmentary view generally analogous to FIGS. 2 and 4 but showing a third alternate embodiment for an exhaust brake according to the present invention.

The Pressure Relief Valve Assembly Depicted In FIGS. 6 and 7

For the embodiments previously described, the biasing mechanism for maintaining the pressure relief valve assembly closed (until its relief pressure limit is overcome by pressure within the inner tube being increased above the opening or relief point) is provided by means of a spring. As indicated above, alternate arrangements or biasing mechanisms are feasible. One such arrangement is generally indicated in FIGS. 6 and 7.

Also, for the embodiments previously described, the pressure relief valve assembly is provided in association with a bypass valve that was selectively operable to place the pressure relief valve assembly on line or off line. In FIGS. 6 and 7, an alternate construction is provided.

Referring to FIG. 6, muffler assembly 200 is depicted in fragmentary side cross-sectional view. Muffler assembly 200 comprises shell 201 defining internal volume 202. A portion of the inlet valve construction is indicated generally at 205. The portion 205 depicted comprises an inlet tube 206 having pressure relief valve assembly 210 mounted thereon.

More specifically, inlet tube 206 includes back wall 212 with aperture 213 therein. Pressure relief valve assembly 210 comprises piston 215 and piston or valve head 216, oriented for sealing engagement with valve seat 217; the valve seat occupying aperture 213.

Still referring to FIG. 6, pressure relief valve assembly 210 includes cover 220 with apertures 221 therein; cover 220 being mounted on wall 212 to enclose the piston 215, valve head 216 and valve seat 217. It will be understood by reference to FIG. 7, that when the valve head 216 is moved out of engagement with the seat 217, exhaust gases within inlet tube 206 can escape through apertures 213 and 221 into volume 202.

Still referring to FIGS. 6 and 7, the pressure relief valve assembly 210 depicted therein is selectively controlled through a pneumatic system, rather than a compressed biasing spring. Referring to FIG. 6, within cover 220 is defined piston chamber 225. A portion of piston 215 extends into chamber 225, terminating at plate 226. Metal bellows 227 provide for a seal around aperture 228 through which piston 215 extends. The volume defined by plate 226, bellows 227 and wall 229 is generally indicated at 230. The volume within chamber 225 external to volume 230 is generally indicated at 231. By reference to FIGS. 6 and 7, it will be understood that (assuming the operating pressures are such that the air or gases within the volumes involved are relatively compressible, which they would be for typical applications) if the pressure within volume 231 is sufficiently high, the piston 215 will be driven toward the inlet tube 206, causing seal of aperture 213 as indicated in FIG. 6. On the other hand, if the pressure in region 231 is sufficiently low, piston 215 will be driven away from inlet tube 206, opening aperture 213 as indicated in FIG. 7. A biasing spring 235 FIG. 6, is provided to facilitate opening (provides a normally open valve position) of the pressure relief valve assembly 210, under conditions of lower pressure in volume 231 relative to pressure in volume 230. Pneumatic pressure for control of the pressure in volume 231 can be provided by inlet tube 240.

The pressure within regions 231 can be established and controlled through tube 240 so that whenever the pressure within region 245 of inlet tube 206 exceeds some predetermined limit, piston 215 is moved (as indicated in FIG. 7) to open aperture 213. The pressure in volume 231 can be further controlled, relative to the pressure in volume 230 and the pressure in volume 245, to retain pressure relief valve assembly 210 partly closed or closed, as indicated in FIG. 6, under conditions of pressure in volume 245 lower than the established pressure relief limit. In addition, through control of pressure in line 240 and volume 231, adjustments can be made in the point of relief pressure, if desired. With respect to this latter feature, the embodiment of FIGS. 6 and 7 is quite different from the embodiments depicted in FIGS. 1–3 and 4–5. In those embodiments, a change in the control pressure for the pressure relief valve assembly would typically be obtained by changing the spring (or possibly amount of compression of the spring), which would require some disassembly. For the embodiment of FIGS. 6 and 7, the control pressure can be modified by simply controlling the pressure in line 240 and volume 231, and thus can be adjusted while the system 200 is fully assembled and mounted in a truck or similar vehicle, if appropriate control means such as a pneumatic pressure regulator is provided.

Still referring to FIGS. 6 and 7, it is noted that the portions of the assembly 200 depicted do not include a tube cover or cover member for the inlet valve assembly; that is the figures do not depict portions analogous to outer tube cover 142, FIGS. 4 and 5, or outer cover 66, FIGS. 1–3. It is foreseen that arrangements analogous to either one of those depicted in FIGS. 1–5 could be utilized in association with the arrangement of FIGS. 6 and 7. For example, the outlet tubes of either arrangement depicted include apertures therein through which tube 240 could be directed. Alternate means of directing tube 240 through the cover could be readily established, however.

It is a unique advantage to the arrangement of FIGS. 6 and 7, however, that a bypass valve assembly is not required. In particular, for the arrangements shown in FIGS. 6 and 7, a pressure sensor 246 is shown in volume 245. Control means (not shown) can be utilized to control the extent to which relief valve assembly 210 is opened, depending upon the pressures sensed by sensor 246. Thus, the arrangement of FIGS. 6 and 7 can be constructed to have aperture 213 opened during normal exhaust flow, closed during breaking and relieved or opened during a maximum pressure situation in volume 245, with closure as soon as pressure below the maximum relief pressure is achieved.

Further, upon review of FIGS. 1–7, it will be apparent there is no requirement that the outlet tube or cover (analogous to tube 66, FIGS. 1–3 or tube 142, FIGS. 4 and 5) have an end wall. A tube opened at both ends could be utilized as the outer cover, since the operation of the tube cover 66, 142 for the arrangements shown, to block apertures in the inlet tube, concerns the side wall of the cylindrical tube member and not any end wall. Thus, an outer sheath (sleeve) or tube having no end wall could be utilized with any of the constructions depicted in FIGS. 1–7, and in particular the arrangement of FIGS. 6 and 7.

Some Suggestions For Specific Constructions

With respect to the exhaust brake constructions indicated in FIGS. 1–7, and as indicated generally above preferably the pressure relief valve assembly should be constructed to open under internal pressure upstream of the valve assembly of 70 psi or less, in a typical over-the-highway truck. That is, the maximum back pressure typical diesel engines used in vehicles can sustain is typically around 60–70 psi or less, sometimes about 50 psi or less. It is foreseen that in typical applications, the preferred opening pressures for the relief valve will be near to, but less than this upper limit, if maximum braking effect is desired.

It is foreseen that a typical preferred control arrangement would be a switch mechanism to bring the exhaust brake on line or off line in conjunction with a throttle activated switch. That is, when the driver releases pressure on the throttle, the system is activated to place the pressure relief valve assembly on line and, thus, engage the exhaust brake. It is foreseen that in a typical preferred situation an overriding on/off switch would be provided to the driver, so that the driver could have the exhaust brake taken completely off operation and avoid automatic engagement of the system whenever the throttle is released.

If configured as indicated in FIGS. 1–3, for a typical diesel powered over-the-highway truck, it is foreseen that six apertures in each of the tubular members, each aperture being about 1" by 3" (2.5 by 7.5 cm), will be appropriate for tubing of about 5" diameter, to allow for: (1) a good rate of exhaust flow through the apertures when desired; and, (2) appropriate sealing coverage when needed.

It is noted that the fit between the tubes of the arrangements indicated in FIGS. 1–3 does not have to be extremely tight, since the normal operation is with the system open to passage of exhaust gases through, and it will not matter if there is some leakage. Even when the valve is closed, and the exhaust brake is on line, a small amount of leakage between the two tubes is acceptable.

Thus, it is foreseen that a clearance of a few thousandths of an inch is acceptable.

It is foreseen that tubular valve constructions such as those described can be readily manufactured from a variety of components. For tubular valves as generally described, the coefficients of thermal expansion for the inner tube and the outer tube should not differ significantly, or problems may result. In particular, if the coefficient of expansion of the inner tube is substantially larger than the co-efficient of expansion for the outer tube, when the inner tube becomes hot it may freeze the valve.

What is claimed is:

1. An exhaust brake arrangement comprising:

(a) an exhaust flow passageway;

(b) a pressure relief valve assembly in operative association with said exhaust flow passageway; said pressure relief valve assembly including means for pressure relief in response to buildup of a selected amount of pressure in said exhaust flow passageway;

(i) said pressure relief valve assembly including a valve head and valve seat positioned in a portion of said exhaust flow passageway; and, (c) a bypass valve construction positioned in operative association with said exhaust flow passageway; said bypass valve construction being selectively positionable in first and second configurations;

(i) said bypass valve construction, when in said first valve configuration, being constructed and arranged to direct exhaust flow in a manner bypassing said pressure relief valve assembly by diverting exhaust gas flow from a location upstream of said valve head and valve seat, around said valve head and valve seat, to a location downstream from said valve head and valve seat, to thereby inhibit build up of pressure within said exhaust flow passageway;

(ii) said bypass valve construction, when in said second valve configuration, being constructed and arranged to inhibit exhaust gas flow from said exhaust flow passageway except as regulated by said pressure relief valve assembly; and, (iii) said bypass valve construction comprising a concentric tube construction having first and second tubular members; said first tubular member being selectively movable relative to said second tubular member, to configure said bypass valve construction between said first and said second valve configurations.

2. An arrangement according to claim 1 wherein said tube construction is constructed and arranged such that said first tubular member is longitudinally slidable, relative to said second tubular member, to selectively configure said bypass valve construction in and between said first and second valve configurations.

3. An arrangement according to claim 1 wherein said biasing arrangement comprises a pneumatic piston.

4. An arrangement according to claim 1 wherein a portion of said second tubular member is positioned within a portion of said first tubular member.

5. An arrangement according to claim 1 wherein said tube construction is constructed and arranged such that said first tubular member is radially rotatable, relative to said second tubular member, to selectively configure said bypass valve construction in and between said first and second valve configurations.

6. An arrangement according to claim 1 wherein:

(a) a portion of said second tubular member is positioned within a portion of said first tubular member; and, (b) said pressure relief valve assembly valve head and valve seat are operably positioned on said portion of said second tubular member which is positioned within a portion of said first tubular member.

7. An arrangement according to claim 1 wherein:

(a) said exhaust flow passageway comprises an inlet to a motor vehicle muffler assembly; and, (b) said pressure relief valve assembly valve head and valve seat are operably positioned within the muffler assembly.

8. An arrangement according to claim 1 wherein:

(a) said valve seat comprises a frusto-conical seat; and, (b) said valve head comprises a frusto-conical head having an outer conical surface oriented for engagement with said valve seat, when said valve head and valve seat are closed.

9. An arrangement according to claim 1 wherein said means for pressure relief in response to build up of a selected amount of pressure within said exhaust flow passageway includes a biasing arrangement constructed and arranged to bias said valve head against said valve seat to close same under a closing pressure corresponding to a selected relief pressure.

10. An arrangement according to claim 9 wherein said biasing arrangement comprises a coiled spring.

11. An arrangement according to claim 9 wherein said biasing arrangement comprises a pneumatic piston.

* * * * *

UNITED STATES PATENT AND TRADEMARK OFFICE
CERTIFICATE OF CORRECTION

PATENT NO. : 5,435,347

DATED : July 25, 1995

INVENTOR(S) : Gillingham

It is certified that error appears in the above-identified patent and that said Letters Patent is hereby corrected as shown below:

In column 4, line 46, "an" should be --and--.

In column 6, line 5, "on" should be --in--.

In column 7, line 7, "value" should be --valve--.

In column 9, line 35, "20" should not be in bold print (signifies pounds of pressure); line 37, delete "to" after the word "withstand".

In column 16, line 34, "70" should not be in bold print (signifies pounds of pressure).

Signed and Sealed this

Third Day of December, 1996

*Attest:*

BRUCE LEHMAN

*Attesting Officer*

*Commissioner of Patents and Trademarks*